(12) United States Patent
San Martin et al.

(10) Patent No.: US 11,016,216 B2
(45) Date of Patent: May 25, 2021

(54) MULTI-SPACING ARRAY TOOL FOR DETERMINING PIPE THICKNESS OF A MULTI-PIPE STRUCTURE

(71) Applicant: Halliburton Energy Services, Inc., Houston, TX (US)

(72) Inventors: Luis Emilio San Martin, Houston, TX (US); Reza Khalaj Amineh, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 256 days.

(21) Appl. No.: 16/306,021

(22) PCT Filed: Aug. 3, 2016

(86) PCT No.: PCT/US2016/045341
§ 371 (c)(1),
(2) Date: Nov. 30, 2018

(87) PCT Pub. No.: WO2018/026362
PCT Pub. Date: Feb. 8, 2018

(65) Prior Publication Data
US 2019/0162870 A1    May 30, 2019

(51) Int. Cl.
*G01V 3/28*    (2006.01)
*E21B 47/00*   (2012.01)
(Continued)

(52) U.S. Cl.
CPC ............... *G01V 3/28* (2013.01); *E21B 47/00* (2013.01); *E21B 47/092* (2020.05); *G01V 3/18* (2013.01); *G01V 3/26* (2013.01); *E21B 47/13* (2020.05)

(58) Field of Classification Search
CPC ... G01V 3/18; G01V 3/26; G01V 3/28; E21B 47/00; E21B 47/085; E21B 47/092;
(Continued)

(56) References Cited

U.S. PATENT DOCUMENTS

| 4,292,589 A | 9/1981 | Bonner |
| 5,157,605 A | 10/1992 | Chandler et al. |

(Continued)

FOREIGN PATENT DOCUMENTS

| EP | 2270420 A1 | 1/2011 |
| EP | 2950038 A1 | 12/2015 |

(Continued)

OTHER PUBLICATIONS

PCT Application Serial No. PCT/US2016/045341, International Search Report, dated Apr. 27, 2017, 3 pages.
(Continued)

*Primary Examiner* — Minh N Tang
(74) *Attorney, Agent, or Firm* — Gilliam IP PLLC

(57) ABSTRACT

Systems and methods to investigate multi-pipe structures for detection of corrosion and quantitative assessment of thickness in the multiple pipes can be implemented in a variety of applications. Systems can include a set of transmitters and multiple receivers arranged on a tool structure with variable distances to the transmitters of the set of transmitters, where the receivers are arranged to measure electromagnetic responses from a multi-pipe structure to excitation of the set of transmitters with the tool structure disposed in the multi-pipe structure. The electromagnetic responses may include responses correlated to a near field zone, a transition zone, and a far field zone, where the electromagnetic responses can be processed to recover individual thicknesses of each pipe of the multi-pipe structure. Additional apparatus, systems, and methods are disclosed.

20 Claims, 8 Drawing Sheets

(51) Int. Cl.
*G01V 3/26* (2006.01)
*G01V 3/18* (2006.01)
*E21B 47/092* (2012.01)
*E21B 47/13* (2012.01)

(58) Field of Classification Search
CPC ..... E21B 47/13; E21B 47/122; G01N 27/902; G01N 27/904; G01N 27/9046; G01N 27/9086
See application file for complete search history.

(56) References Cited

U.S. PATENT DOCUMENTS

| | | |
|---|---|---|
| 7,960,969 B2 | 6/2011 | Mouget et al. |
| 2009/0195244 A1 | 8/2009 | Mouget et al. |
| 2013/0193953 A1 | 8/2013 | Yarbro et al. |
| 2016/0160629 A1 | 6/2016 | Donderici et al. |
| 2016/0168975 A1 | 6/2016 | Donderici et al. |
| 2016/0187523 A1* | 6/2016 | Sanmartin ............ E21B 47/092 324/339 |
| 2016/0194948 A1 | 7/2016 | Donderici et al. |
| 2016/0327675 A1* | 11/2016 | Donderici ............ E21B 47/002 |

FOREIGN PATENT DOCUMENTS

| | | |
|---|---|---|
| WO | 2015126243 A1 | 8/2015 |
| WO | 2016010917 A1 | 1/2016 |
| WO | 2017196357 A1 | 11/2017 |
| WO | 2017196371 A1 | 11/2017 |
| WO | 2018031037 A1 | 2/2018 |

OTHER PUBLICATIONS

PCT Application Serial No. PCT/US2016/045341, International Written Opinion, dated Apr. 27, 2017, 16 pages.

EP Application Serial No. 16911768.6, Extended European Search Report, dated Nov. 28, 2019, 9 pages.

Acuña, et al., "Scanning for downhole corrosion", Oilfield Review, 2010, 9 pages.

Doll, "Introduction to Induction Logging and Application to Logging of Wells Drilled with Oil Base Mud", Petroleum Transactions, AIME, 1949, 15 pages.

Rourke, et al., "Multi-Tubular Corrosion Inspection Using a Pulsed Eddy Current Logging Tool", International Petroleum Technology Conference, 2013, 6 pages.

* cited by examiner

MULTI-SPACING ARRAY TOOL FOR DETERMINING PIPE THICKNESS OF A MULTI-PIPE STRUCTURE

TECHNICAL FIELD

The present invention relates generally to apparatus and methods with respect to measurements related to oil and gas exploration.

BACKGROUND

Early detection of corrosion in well casings is crucial to ensure the integrity and the safety of the well. State-of-the-art methods for downhole corrosion detection involve running corrosion detection tools in the production tubing. Different types of corrosion detection tools include mechanical calipers, ultrasonic acoustic tools, cameras, electromagnetic flux leakage, and electromagnetic induction tools. Among all these tools, only electromagnetic (EM) induction tools can be used to detect corrosion in outer casings beyond that in which the tool is run, which is the first pipe of multiple concentric pipes. Electromagnetic induction can be used to obtain measurements that can be used to estimate pipe thicknesses to assess the integrity of the pipes and estimate the degradation due to corrosion after years of exposure to the downhole environment. EM sensing may provide continuous, in situ measurements of the integrity of tubing/casing. EM technologies developed for such monitoring applications can be categorized into two groups: frequency-domain techniques and time-domain techniques.

In the operation of induction corrosion detection tools available in the market, one or more transmitters generate a primary field that induces eddy currents inside metallic pipes being investigated by the induction corrosion detection tools. The metallic pipes may be a set of nested pipes. The induced eddy currents in the pipes produce a secondary field, which is measured by one or more receivers. The secondary field contains information about the electrical properties and thickness or defects of the metallic pipes. This information can be processed to detect corrosion in the metallic pipes. EM induction tools can be frequency-domain (FD) tools that operate at a discrete set of frequencies. Higher frequencies can be used to inspect inner pipes and lower frequencies can be used to inspect outer pipes. Alternatively, EM induction tools can operate in time-domain (TD) by transmitting transient pulses and measuring the decay response versus time. An earlier time corresponds to inner pipes and later times correspond to outer pipes. These EM induction tools are referred to as pulsed eddy current corrosion detection tools.

Frequency domain tools in use rely on remote field eddy current (RFEC) regime method to estimate properties of pipes beyond the innermost pipe. RFEC relies on an approximate linear relation between the phase measured at a receiver referenced to the transmitter phase, and total metal thickness, without discriminating in which pipe is the defect. In time domain tools, the transmitter is excited with a pulse and a receiver measures the decay after the transmitter is turned off. In frequency domain tools, the transmitter and the receivers are separated by a distance, so that the secondary field is stronger relative to the direct signal from the transmitter. In time domain tools, after the transmitter is turned off, the direct field is present only in the initial part of the decay and after that the secondary field generated by eddy currents in the pipes is measured. In time domain tools, the transmitter and receiver are typically collocated. Typically, these conventional tools, discussed above for example, can detect two or three pipe thicknesses quantitatively and qualitatively up to four pipes.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, mechanical, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Herein, a multi-pipe structure is a structure having a set of two or more pipes nested within each other, the set having an innermost pipe and an outermost pipe, where the innermost pipe has the smallest outer diameter of the pipes of the set, the outermost pipe has the largest outer diameter of the pipes of the set, and the remaining pipes of the set have outer diameters of value greater than the value of the outer diameter of the innermost pipe and less than the value of the inner diameter of the outermost pipe with each pipe of the set having a different outer diameter with respect to the other pipes of the set. At a point on a reference axis within the innermost pipe of the set in the longitudinal direction of the innermost pipe, a plane perpendicular to the reference axis intersects the pipes of the multi-pipe structure. In various embodiments, a multi-pipe structure can be realized by a set of concentric pipes. However, a multi-pipe structure is not limited to a set of concentric pipes.

Figure 1:
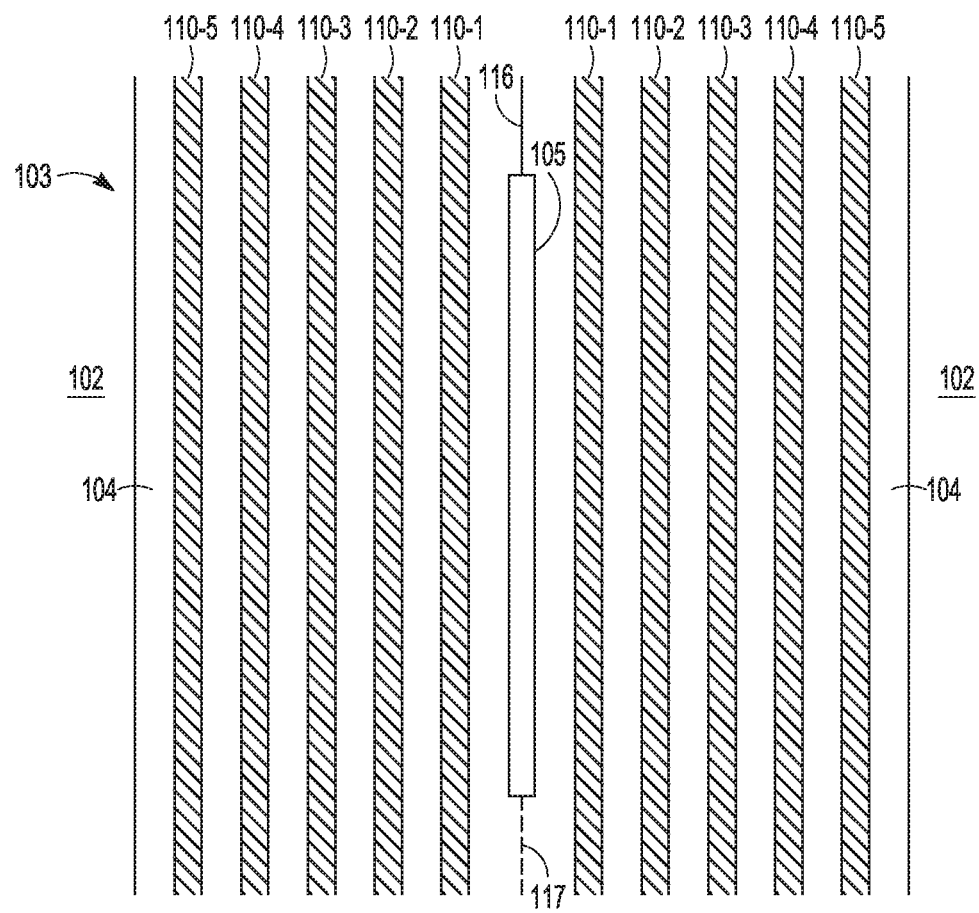
FIG. 1 is a schematic representation of a corrosion detection tool within a multiple pipe configuration having five concentric pipes, in accordance with various embodiments.

FIG. 1 is a schematic representation of an embodiment of an example corrosion detection tool 105 within a multi-pipe structure 103 having multiple concentric pipes (five are shown 110-1, 110-2, 110-3, 110-4, and 110-5). The corrosion detection tool 105 can be moved along the length of the multi-pipe structure 103 in a wellbore 104 in a formation 102 by a conveyance 116, such as moving the corrosion detection tool 105 along a longitudinal axis 117 of innermost pipe 110-1 to make measurements at different depths. The symmetry axis of the corrosion detection tool 105 may coincide with the longitudinal axis 117 of the innermost pipe 110-1. The symmetry axis of the corrosion detection tool 105 can be taken as a reference axis to evaluate concentric pipe structure 103. The corrosion detection tool 105 can include a set of transmitters and a set of receivers that can be moved along the longitudinal axis 117 of innermost pipe 110-1 to make measurements at different depths. The set of transmitters and a set of receivers can be arranged in a number of different formats in accordance with structures as discussed below. Slickline arrangements, or other conventional techniques such as wireline arrangements, coiled tubing arrangements, drill pipe arrangements, downhole tractor arrangements, or other appropriate arrangements, can be used to dispose the corrosion detection tool 105 in the multi-pipe structure 105 below the earth's surface at a well site.

The number of pipes assessed for corrosion in this example is larger than in other state of the art corrosion detection tools. For example, the corrosion detection tool 105 can be structured to detect corrosion in any of the pipes 110-1, 110-2, 110-3, 110-4, and 110-5. The corrosion detection tool 105 can also operate successfully in wells with fewer concentric pipes and can be applied to multi-pipe structures having more than five pipes. For example, the corrosion detection tool 105, as taught herein, can be used to solve the individual thickness of each of the pipes in configurations in a cased hole with multiple pipes. Such tool designs are suited to solve for the thicknesses in relatively standard cases of one, two, and three concentric pipes, as well as less common cases of four, five, six, or more concentric pipes.

Figure 2:
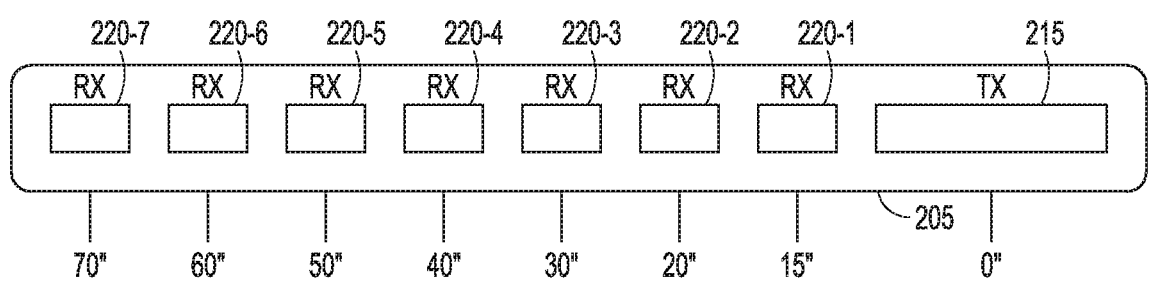
FIG. 2 is a schematic description of an example of an asymmetric tool for detection of corrosion and quantitative assessment of thickness in multiple pipes, in accordance with various embodiments.

FIG. 2 is a schematic description of an embodiment of an example of an asymmetric tool 205 for detection of corrosion and quantitative assessment of thickness in multiple pipes. The tool 205 can be used as the corrosion detection tool 105 in the arrangement of FIG. 1. The tool 205 can include transmitter 215 and receivers 220-1, 220-2, 220-3, 220-4, 220-5, 220-6, and 220-7 where the receivers 220-1, 220-2, 220-3, 220-4, 220-5, 220-6, and 220-7 are spaced apart from the transmitter 215 by different distances. Examples of the distances that can be used include 15, 20, 30, 40, 50, 60, and 70 inches. The tool 205 can be implemented with other distances. In the asymmetric design, an EM field can be measured at multiple distances from the transmitter. Though one transmitter is shown, the asymmetric tool can include more transmitters. Multiple distances (TX-RX) between transmitter and receiver are included in the asymmetric tool 205 to fully measure the field distribution generated by the primary field generated by the transmitter and the secondary field generated by the pipes that surround the tool.

The asymmetric tool design includes multiple receivers 220-1, 220-2, 220-3, 220-4, 220-5, 220-6, and 220-7 with variable distance to the transmitter 215 or multiple transmitters. The receivers 220-1, 220-2, 220-3, 220-4, 220-5, 220-6, and 220-7 measure the electromagnetic response of the pipe system to the excitation of the transmitter 215 or multiple transmitters. The receivers 220-1, 220-2, 220-3, 220-4, 220-5, 220-6, and 220-7 are placed to measure the EM field distribution along the axis including both the near field as well as the far field, which are two qualitatively different regions of the response. The asymmetric tool 205 can include receiver arrays in sufficient number to record the response of defects due to corrosion on multiple pipes at multiple frequencies of operation, so that the thickness of each one of the pipes can be extracted by using an inversion scheme. An inversion scheme can be implemented to determine a value or variation of a physical property or feature by comparing measurements to the predictions of a model.

Figure 3:
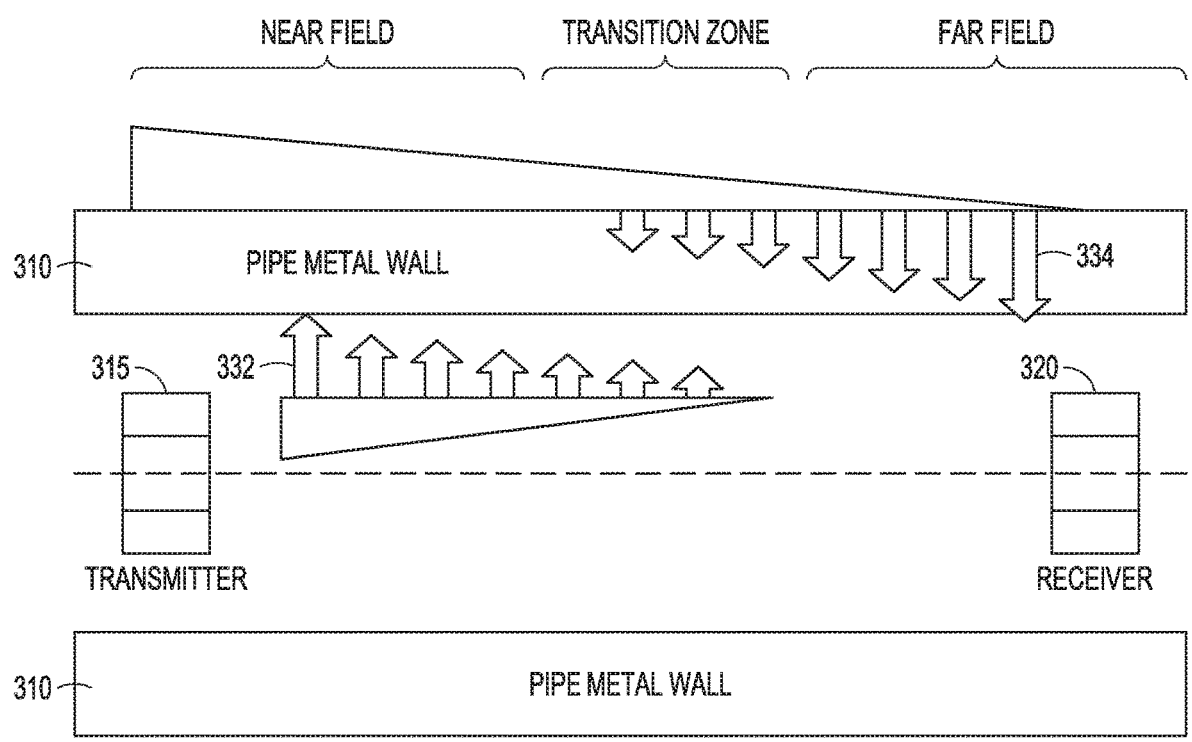
FIG. 3 is a schematic description of primary and secondary field distributions that reach a receiver, in accordance with various embodiments.

The primary field generated by a transmitter induces eddy currents in the pipes. At the receivers, both the primary field and the secondary field generated by currents induced in the pipes are present in different ratios depending on the distance between transmitter and receiver. FIG. 3 is a schematic description of the primary field distribution 332 and the secondary field distribution 334 that reach the receiver 320 from excitation of transmitter 315. The relative proportion of primary and secondary field measured by a receiver 320 depends on the number of pipes, the geometry of the pipes, and the physical properties of the pipes, as well as the distance between transmitter and receiver. In the near field zone, the primary field predominates, while, in the far field, the secondary field provides the main contribution.

In FIG. 3, three zones are distinguished. The near field zone can be defined as the zone where the secondary field is predominant, which extends from the edge of the transmitter to the point at which the secondary and the direct field are approximately equal. The transition zone can be defined as starting at the point where the secondary field and the primary fields are approximately equal and ending where the secondary field is 10 times larger than the direct field. The far zone can be defined as starting where the secondary field is larger than 10 times the direct field extending to the point at which the field is negligible. The spatial length of these zones depends on the surrounding pipe configuration, including number of pipes, pipes diameters and thickness, as well as tool geometry, primarily transmitter geometry including length and diameter and the magnetic core permeability. The innermost pipe is generally a production pipe with OD larger than 2.5 inches and the outermost pipe is typically a casing with OD of 18 inches or larger. In this wide range of possible configurations, the location of the transition zone can vary significantly.

In frequency domain tools that operate in the continuous wave mode, transmitter and receivers are placed separate from each other at a certain distance, because very close to the transmitter the primary field signal is much larger than the scattered field. The relative amounts of scattered field and direct field vary as distance increases, and for a better inversion response, it is important to capture the response at multiple receiver distances. Defects in the pipes, due to corrosion, generate disturbances in the EM field. The disturbance pattern, at different distances and at different frequencies, provides information for processing to extract the best estimation of the magnitude and position of the defect within the multiple pipes. In some instances, a partial measuring of the pattern of field variation from near field to far field may be sufficient. For optimal results it is best to measure in all three zones, although very near the transmitter, the field pattern contains mostly information about innermost pipe and its measurement could be omitted if detailed information of the first pipe is provided by another tool, given that tools are available that can acquire high resolution information of the innermost pipe.

There are frequency domain tools that assess the thickness of deeper pipes, beyond the innermost, by relying on antennas working in the RFEC regime, in the far field region. In the RFEC regime, an approximate linear relation exists between the total electrical thickness of all the pipes and the phase at a receiver, where the phase is referenced to the transmitter. The total electrical thickness of all the pipes is defined as the thickness measured in units of the skin depth $\delta=(2/\omega\mu\sigma)^{1/2}$, where $\omega$ is the angular frequency, $\mu$ is the magnetic permeability, and $\sigma$ is the electrical conductivity.

In various embodiments, tools as taught herein do not use this linear relation between phase and total thickness in the RFEC regime, but instead rely on the response pattern on multiple receivers located at various distances from one or more transmitters of the tool. The presence of a defect generates a characteristic field disturbance that is measured at each one of the receivers. From the specific pattern of disturbance as registered by the multiple receivers, an inversion scheme can recover the magnitude and location of the defect. Ideally, the transmitter(s) should excite multiple frequencies that can vary between 0.1 Hz to 10 Hz for the measurements of defects in the pipes beyond the innermost pipe and should excite multiple frequencies that can vary between 10 Hz to 1000 Hz for the defects in the innermost pipe. The multiple responses at different receiver distances and different frequencies provide raw data that a selected inversion scheme can process to recover the individual thicknesses of each one of the pipes in a multi-pipe structure. In an example, individual thicknesses of each one of five or more concentric pipes and total metal thickness of more than two inches may be recovered.

In particular, to identify defects in the $3^{rd}$, $4^{th}$, $5^{th}$ or even deeper pipes of a multi-pipe structure, all three field regions (the near field zone, the transition field zone, and the far field zone) should be measured with at least one receiver in each region. As the IDs and thicknesses of the pipes can vary within a wide range, the distance between the transition zone and the center of the transmitter can also vary significantly. In an embodiment, the tool should have at least three receivers at different positions along the axis of the tool with transmitter to receiver distances ranging between 5 inches and 70 inches, measured along the axis of the tool. It is more convenient to have more than 3 receivers at different distances along the axis to better capture the field pattern from the near field through the transition zone and to the far field zone in a well resolved manner for any pipe configuration that can include pipes from OD of 2.5 inches as well as pipes with OD of 20 inches. The additional information acquired with more than three receivers is important to better solve the inversion problem. The information from each of the multiple receivers helps improve the inversion of individual pipe thicknesses. One way to describe the crucial point regarding the position of the receivers to capture the field pattern is by requiring that the at least 3 receivers be placed in the zone that spans from 2*ID of innermost pipe to 4*ID of outermost pipe (* is the multiplication operator). The receivers should be placed so that they are sensitive to variations in the thicknesses of the pipes in the entire range of possible pipe configurations. In cases with of more than 3 pipes it is convenient to use more 3 receivers and it could be as many as 8 or more.

Another way to describe the location of the receivers is to do it in terms of the length of the transmitters. It is known in the art that the length of the transmitter is related to the depth that the field can reach inside the pipes. A larger transmitter with its magnetic core can generate fields that can penetrate deeper radially across the metal pipes. If we compare a longer transmitter and a shorter transmitter in relative terms, the longer transmitter is more sensitive to the outer pipes and the shorter transmitter is more sensitive to the inner pipes. The length of the transmitters can be used to describe the zone where the receivers should be placed. The zone where the at least 3 receivers should be placed to measure the field pattern from the near field to the far field can alternatively be described as the zone that extends from 0.75*L to 5*L where L is the length of the transmitter.

A key ingredient for various embodiments of implementation of a tool for detection of corrosion and quantitative assessment of thickness in multiple pipes is measurement of the field at multiple distances between transmitter and receiver and the operation at multiple frequencies. By combining all this information in the processing of received signals, individual thickness estimates for each of the pipes in a configuration of five pipes or more can be derived.

These ingredients have so far been explained as applied to a frequency domain tool but can also be used in the case of a time domain tool. For example, the tool described in FIG. 2 can operate as a time domain tool in which the transmitter is excited by a pulse excitation, and the multiple receivers placed at different distances measure the decay of the field after the transmitter has been turned off.

After the signals are measured, deconvolution may be applied to reduce the double peaks associated with large transmitter-receiver distances (for a transmitter with magnetic core of 16 inches long and receivers of 8 inches long, the typical distance beyond which the double peaks occur is approximately 30 inches) and to improve the resolution of the measurements, followed by an inversion to find the location of defects in each of the pipes of the configuration. In the frequency domain, for each receiver at each frequency, the measurement produces a voltage expressed with real and imaginary part, or magnitude and phase expressed in polar coordinates. In the time domain, the measurement involves real numbers that capture the decay of the voltage as a function of time. The long time part of the decay in the time domain tool contains information about the deeper pipes, and equivalently the low frequency domain in the frequency domain tool contains information about the deeper pipes. On the other hand, the early time response in the time domain tool contains information about the shallower pipes, and equivalently the higher frequencies in the frequency domain tool contain information about shallower pipes.

The deconvolution above mentioned involves the use of an approximate impulse response generated by the response of a small defect. The tool response is the convolution of the small defect response and the pipe defects, thus to improve the detection of defects, a deconvolution between tool log and the small defect response can be used. A deconvolution process can be performed by acquiring the measured responses of the receivers for a test configuration as well as the responses for these receivers to a small defect placed on the same pipe configuration. The latter responses can be obtained from simulations or from previous measurements for the same pipe configuration but with a known small defect. Small defect should be as short as possible along the depth (but still measurable) such that the response of that could be used as an approximate impulse response of the measurement system (as if there is a delta function in thickness variation along the depth). Then, using the collected responses for unknown defects and the responses of the small defect (approximated as the impulse response), a deconvolution process can be implemented in the spatial domain or Fourier domain to improve the resolution of the responses along the depth.

The use of multiple distance and multiple frequencies provides a mechanism to solve the inversion problem with a large number of unknowns that includes, in addition to the thicknesses of each pipe, the physical properties of the pipes including magnetic permeability and electrical conductivity of each pipe. In general, in this type of problems, significant information is known a priori. For example, the original nominal outer diameter (OD) and inner diameter (ID) of the pipes, and the electrical conductivity are typically known because the type of steel used in the wells is usually known. The magnetic permeability of each of the pipes is included among the unknowns in the inversion because this property is not typically available and can vary considerably from pipe to pipe. The range of values that the relative magnetic permeability can take varies between approximately 1 and 200, although in the most common cases, the range of values is between 1 and 90. The value of 1 applies to nonmagnetic alloy pipes, which are sometimes used in completions. Additional unknowns can include the eccentricity of the tool within the first pipe and the eccentricity of the different pipes.

Designs as taught herein are especially suited to determine thicknesses in configurations with multiple pipes, such as four, five, six, or more pipes, which cannot be accomplished with state of the art logging tools, but such designs can also operate successfully in standard situations with one, two, or three concentric pipes. The innermost pipe OD can be as small as 2⅞ inches and the outermost pipe OD can be as large as 20 inches or more. This wide range of different possible scenarios can be addressed by using different sets of frequencies and multiple distances between transmitters and receivers for optimal results. A number of frequencies can be used simultaneously in continuous mode including frequencies 0.5-10 Hz for gathering information about defects in the deeper pipes, as well as higher frequencies 10-10,000 Hz to gather information about defects in the inner pipes. However, for efficient use of the available power downhole, it is convenient to select the frequencies according to the specifics of the conditions of the well to be assessed for corrosion. Normally before a corrosion assessment job, information about the number of pipes and their nominal thicknesses is available and the job can be planned in advance. At this stage, the optimal frequency set for the assessment of the inner and outer pipes can be selected.

The variations in signal levels associated with defects in outermost pipes, such as $4^{th}$ $5^{th}$ or $6^{th}$ pipes for example, can be very small, and it is important that the noise in the measurements be as small as possible and that the signals be as large as possible. To reduce the noise, low noise electronics components can be selected and design choices can be made to minimize interference from wire routing. Other noise sources are electrical noise from other tools. This noise can be monitored and subtracted from the signals. Another important source of noise is the noise associated with or attributed to tool movement. This noise can be characterized by using accelerometers. The signals generated by the accelerometers can be used to mitigate this source of noise.

The convenient values for the frequencies to be used can be estimated from the number of pipes to be assessed and their nominal metal thickness. Typically, for total metal thickness of more than two inches at typical relative permeability values of 60, the lowest frequency can be as low as 0.5 Hz; the number of frequencies can be 4-8 or more frequencies in the low range between 0.5-10 Hz; and 2-8 frequencies in the higher frequency range to assess the inner most pipes 10-10,000 Hz. The specific values of frequencies can be selected by optimizing the sensitivity to defect and the signal to noise ratio. The signal to noise ratio can be estimated for the known number of pipes and nominal thicknesses of the specific well to be logged and the logging speed to be used.

Figure 4:
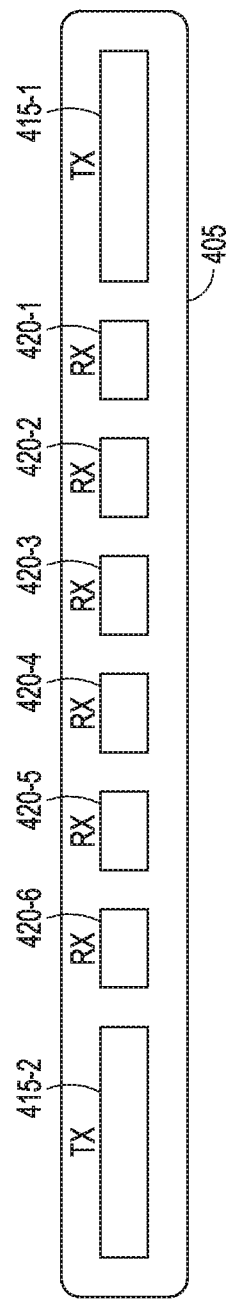
FIG. 4 is a schematic of an example tool for detection of corrosion and quantitative assessment of thickness in multiple pipes that includes two transmitters, providing a double transmitter design, in accordance with various embodiments.
Figure 5:
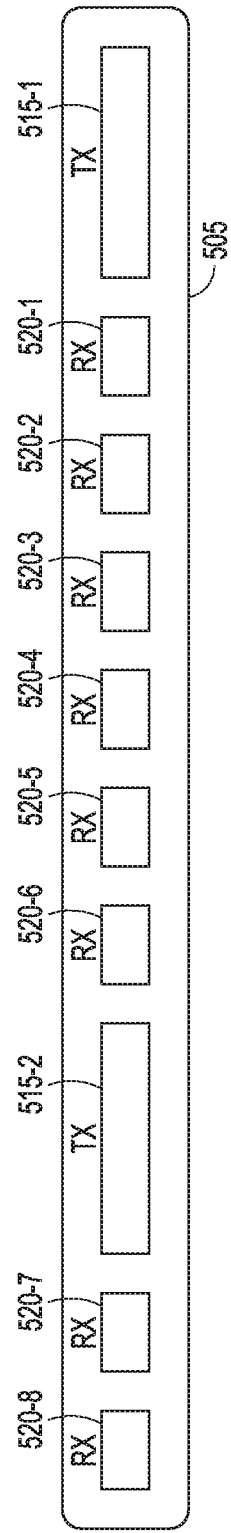
FIG. 5 is a schematic of an example tool for detection of corrosion and quantitative assessment of thickness in multiple pipes that includes a high resolution short array with one of the transmitters having a reduced length to generate a high resolution measurement, in accordance with various embodiments.

Other embodiments of example tools for detection of corrosion and quantitative assessment of thickness in multiple pipes are shown in FIG. 4 and FIG. 5. FIG. 4 is a schematic of an embodiment of an example tool 405 for detection of corrosion and quantitative assessment of thickness in multiple pipes that includes two transmitters 415-1 and 415-2, providing a double transmitter design. The tool 405 can be used as the corrosion detection tool 105 in the arrangement of FIG. 1. The two transmitters 415-1 and 415-2 can be symmetric with respect to the middle of the tool 405. Multiple receivers 420-1, 420-2, 420-3, 420-4, 420-5, and 420-6 can be placed in between the two transmitters 415-1 and 415-2 and also symmetric with respect to the middle of the tool.

The receivers 420-1, 420-2, 420-3, 420-4, 420-5, and 420-6 can be placed in pairs (with each member of the pair located symmetrically on opposite sides of the with respect to the center of the tool) at variable distance from the transmitters 415-1 and 415-2 to measure the field in the near and far field in any variety of logging conditions. In this case, due to the symmetric placement of the transmitters 415-1 and 415-2, a set of compensated measurements can be generated, which is an additional enhancement. The compensated measurements help in reducing errors due to individual sensor inaccuracies. For example, phase differences between two receivers can be measured as one or the other of the transmitters 415-1 and 415-2 are energized. These two measurements can be combined and, as is well known in the art, the combined measurement can be more accurate. A procedure for combining measurements is well known.

FIG. 5 is a schematic of an embodiment of an example tool 505 for detection of corrosion and quantitative assessment of thickness in multiple pipes that includes a high resolution short array with one of transmitters 515-1 and 515-2 having a reduced length to generate a higher resolution measurement. The reduced transmitter size allows for shorter distance between the center of the transmitter and the center of the receiver. The tool 505 can be used as the corrosion detection tool 105 in the arrangement of FIG. 1. Receivers 520-1, 520-2, 520-3, 520-4, 520-5, and 520-6 can be disposed between transmitters 515-1 and 515-2 with receivers 520-7 and 520-8 disposed along the tool 505 from transmitter 515-2 in a direction opposite the direction from transmitter 515-2 to transmitter 515-1. The tool 505, with transmitter 515-2 having a shorter length than transmitter 515-1, where the shorter length can provide for obtaining improved resolution by using close receivers in the opposite direction along the axis of the tool 505. The higher resolution receiver should be placed at a distance shorter than the shortest transmitter-receiver distance on the other side. The shorter transmitter and shorter transmitter receiver distance produce measurements that are more sensitive to the inner pipes.

Figure 6:
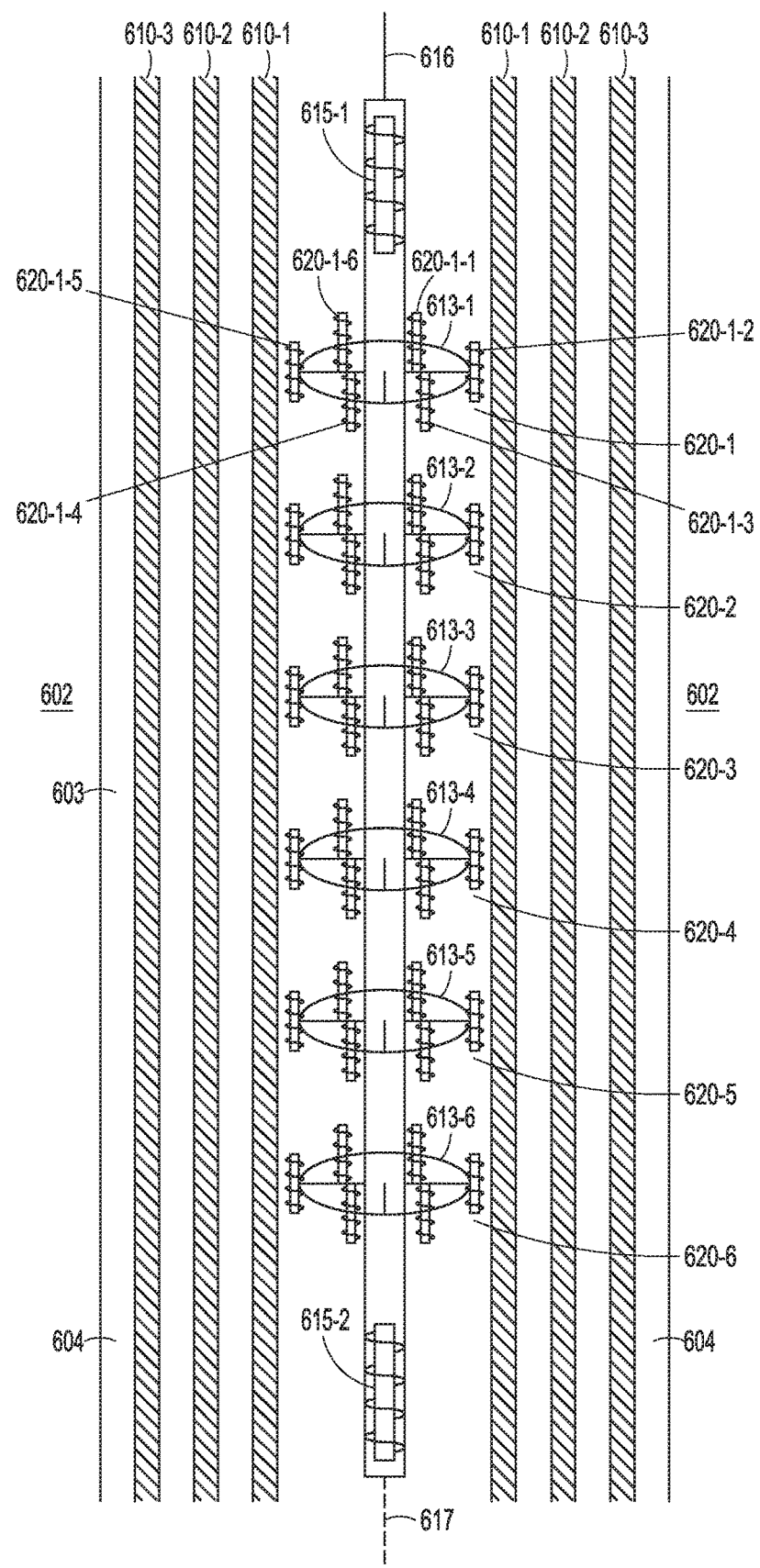
FIG. 6 is a schematic description of an azimuthally sensitive design of an example of a tool for detection of corrosion and quantitative assessment of thickness in multiple pipes, in accordance with various embodiments.

FIG. 6 is a schematic description of an azimuthally sensitive design of an embodiment of an example tool 605 for detection of corrosion and quantitative assessment of thickness in multiple pipes. The tool 605 can also be used as the corrosion detection tool 105 in the arrangement of FIG. 1. Here, tool 605 is disposed in a multi-pipe structure 603 having pipes 610-1, 610-2, and 610-3, though utilization of tool 605 is not limited to a structure having three pipes. Multiple receiver arrays 620-1, 620-2, 620-3, 620-4, 620-5, and 620-6 are at multiple distances from transmitters 615-1 and 615-2, with the tool 605 disposed in a wellbore 604 in a formation 602 by a conveyance 616, which can be arranged to move the tool 605 along a longitudinal axis 617 of multi-pipe structure 603. The two transmitters 615-1 and 615-2 can be symmetrically placed. This design could also operate with a single transmitter in an asymmetric design.

The multiple receiver arrays 620-1, 620-2, 620-3, 620-4, 620-5, and 620-6 can include a plurality of azimuthally sensitive receivers at each of a plurality of different axial distances along the tool structure arranged such that each of the plurality of azimuthally sensitive receivers at each axial distance extends to near an inner surface of the innermost pipe 610-1 of the multi-pipe structure 603. In this example, receiver array 620-i includes receivers 620-i-j, i=1 . . . , 6, j=1 . . . 6, though only 620-1 is shown with it receivers being numbered receivers for convenience in understanding the embodiment represented with FIG. 6. The number of receiver arrays is not limited to six and the number of receivers in a receiver array is not limited to six. In an embodiment, the different receiver arrays may have different numbers of receivers around the axis of the tool 605. The receiver arrays 620-1, 620-2, 620-3, 620-4, 620-5, and 620-6 can be supported by a rigid non-magnetic metallic structure 613-1, 613-2, 613-3, 613-4, 613-5, and 613-6, respectively, or each receiver array can be mounted on a pad that can extend to reach the inner surface of the innermost pipe 610-1.

Data processing that can include deconvolution and inversion can be conducted with various configurations of a tool for detection of corrosion and quantitative assessment of thickness in multiple pipes as taught herein. Features of the various tools may be interchanged to form additional tool designs that allow measurement of the three zones: near field, transition field, and far field. For the purpose of explanation, consider a tool similar to that shown in FIG. 2, with one transmitter and multiple receivers placed at variable distances from the transmitter. For example, the receivers may be disposed at 12 in, 20 in, 30 in, 40 in, 50 in, and 62 in from the transmitter for the long transmitter 515-1 and at 6 in and 10 in for the short transmitter 515-2 in FIG. 5. The data may be processed first by deconvolution to reduce shoulder bed effect and improve resolution.

Figure 7A:
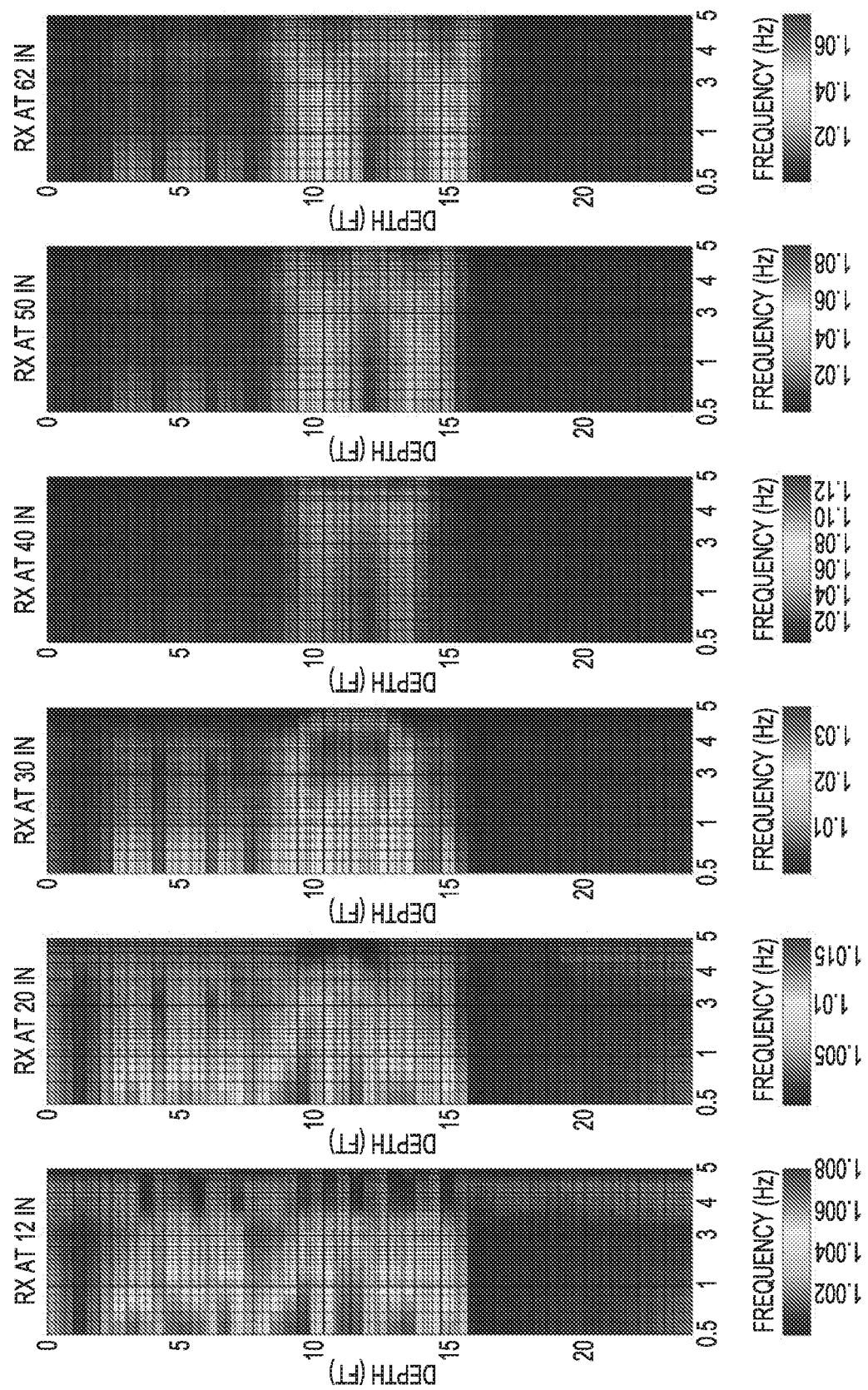
FIG. 7A are presentations of raw responses for the four pipes with one small defect on the outermost pipe, in accordance with various embodiments.
Figure 7B:
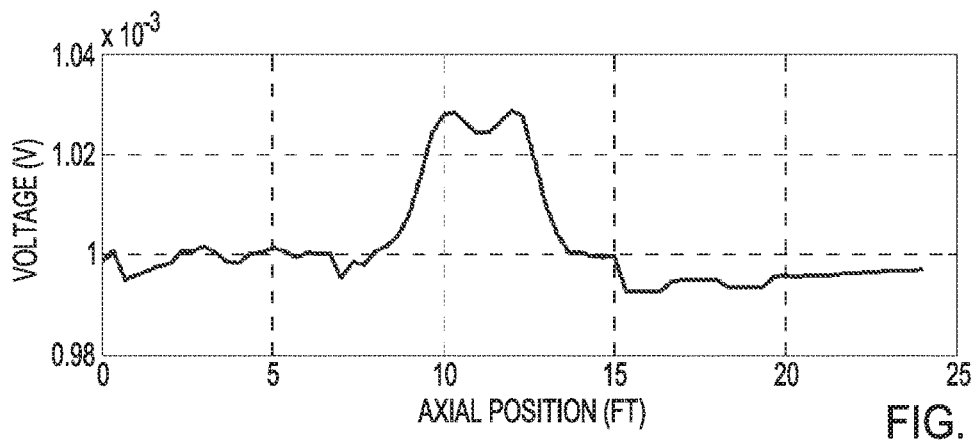
FIGS. 7B-7E are plots of responses for transmitter-receivers distances, in accordance with various embodiments.
Figure 7C:
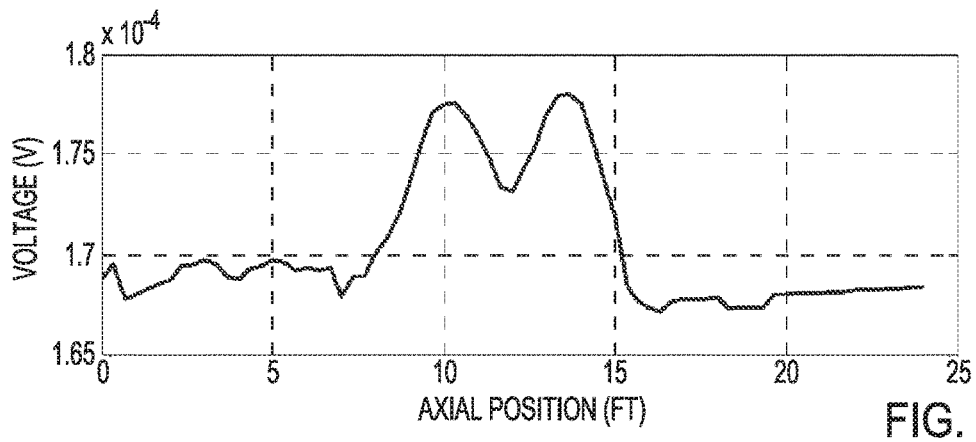
Figure 7D:
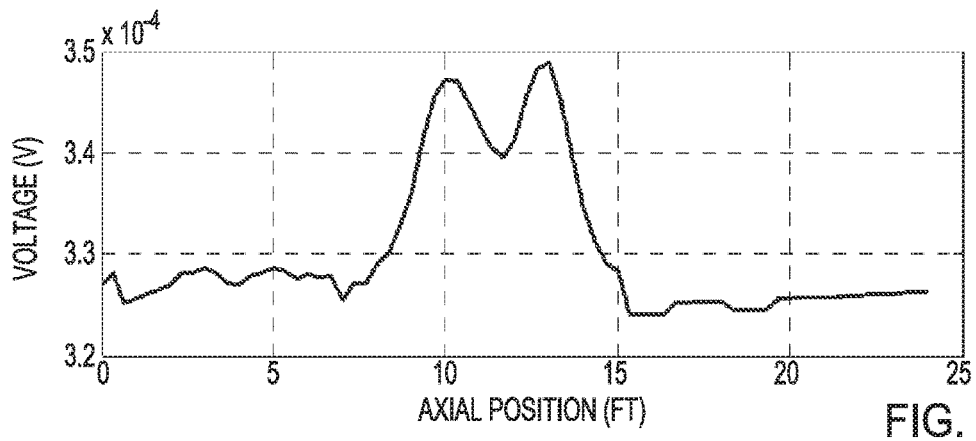
Figure 7E:
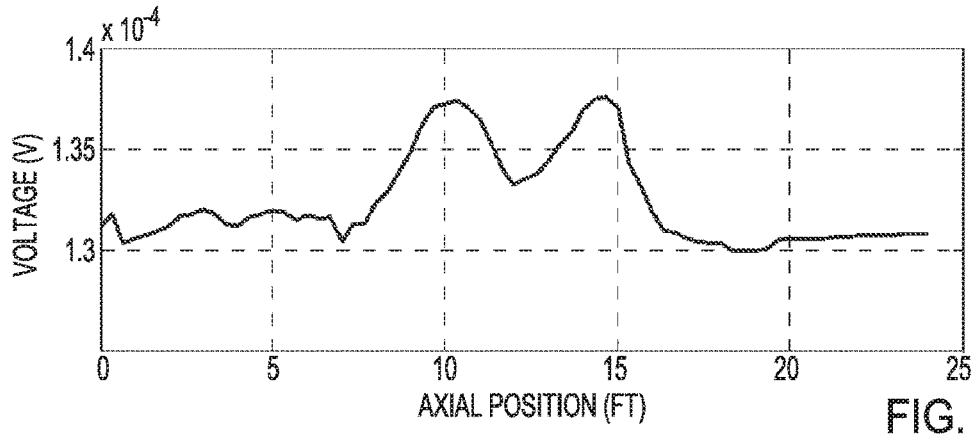

A tool, with parameters of dimensions and positions of coils shown in Table 1, in a multi-pipe structure of four pipes with a small defect on pipe four is considered to illustrate a ghost effect. FIG. 7A are presentations of raw responses for the four pipes with one small defect on the outermost pipe (pipe four). Each frequency/receiver log is normalized to the point that has the minimum magnitude. The ghost effect (double peaks) is observed at larger transmitter-receiver distances. FIGS. 7B-7E are plots of responses for the transmitter-receivers distances of 30 in, 40 in, 50 in, and 62 in, respectively, and at 3 Hz for better visualization of the ghost (double maximum effect.

TABLE 1

| Coil | OD (in) | Number of Turns | Length (in) | Position with respect to the TX |
|------|---------|-----------------|-------------|--------------------------------|
| TX   | 1.28    | 5200            | 16          | 0                              |
| RX1  | 0.988   | 9300            | 4           | 12                             |
| RX2  | 0.978   | 17700           | 8           | 20                             |
| RX3  | 0.978   | 17700           | 8           | 30                             |
| RX4  | 0.978   | 17700           | 8           | 40                             |
| RX5  | 0.978   | 17700           | 8           | 50                             |
| RX6  | 0.978   | 27000           | 12          | 62                             |

An impulse response, which is approximated with the response due the small defect on pipe four, for transmitter-receiver distance larger or equal than 30 inches shows double maximums, as shown in FIGS. 7B-7E. The presence of two maximums is due to the fact that during the logging, in one logging position corresponding to the first maximum, the defect is in front of the transmitter and, in a second logging position corresponding to the second maximum, the defect is in front of the receiver or vice versa. These maximums are sometimes called "ghosts" in the technical literature. The use of deconvolution on raw data of every receiver at every frequency can remove "ghosts" and improve resolution. After deconvolution, the data can be processed with an inversion algorithm to recover more detailed information on the metal loss in each of the multiple pipes in the configuration. The recovery of metal thickness of each pipe of a multi-pipe structure, for example a concentric configuration, is not currently available in frequency domain tools, due to the reliance of currently available tools on the RFEC type of assessment, which only delivers total metal thickness and not the individual thickness of the pipes.

Figure 8:
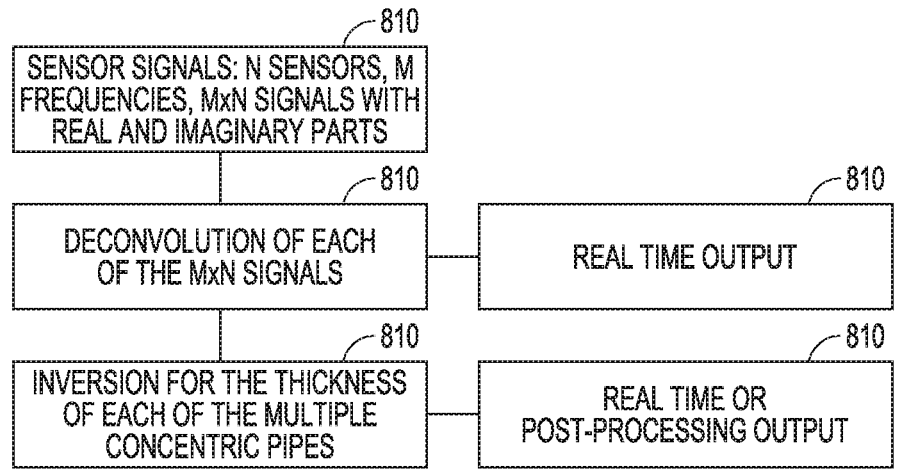
FIG. 8 is a flow diagram of an example method of processing to be applied to the data from a corrosion assessment tool, in accordance with various embodiments.

FIG. 8 is a flow diagram of an embodiment of an example method of processing applied to the data from a corrosion assessment tool. At 810, sensor signals from N sensors at M frequencies are acquired, providing N×M signals with real and imaginary parts. At 820, deconvolution of each of the N×M signals is conducted. The data from the N sensors and the M frequencies having real and imaginary parts can be processed to reduce shoulder bed effect and improve resolution. In some cases, when the distance between transmitter and receiver is relatively small, (for example a distance between transmitter and receiver less than twice the length of the transmitter) the use of deconvolution may not be necessary, as in these cases no separate peaks associated for a single defect appear in the logs. At 830, a real time output can be obtained. The real time output can be obtained because deconvolution is fast enough to deliver processed data in real time. At 840, after deconvolution, inversion is applied to the data to recover the thickness of each pipe. At 850, after the inversion, real time or post-processing output is provided.

The application of deconvolution can be conducted in real time with a small delay to fill a buffer for the processing that normally includes the length of the impulse response of the specific distance transmitter receiver. Notice that in FIG. 8 after application of deconvolution, the output can be analyzed for information about the metal loss of the pipes. The data can also be processed by the inversion to obtain a better quality assessment of the metal loss in each of the pipes. Normally, the inversion is more time consuming and real time processing may or may not be possible depending on the efficiency of the forward model used in the inversion. As implemented herein by forward model is meant a numerical simulation of the electromagnetic phenomenon including the transmitter excitation and the multiple receiver measurements. This numerical simulation can be implemented by a numerical code that solves Maxwell's equations in the conditions the tool encounters inside the well (for given pipe parameters and geometry). Forward models are simulation models that can, as implemented herein predict the responses measured by the receivers due to known pipe configuration including the metal loss region. They can be based on numerical techniques such as finite difference time domain (FDTD) or finite element method (FEM) or analytical approaches.

Figure 9:
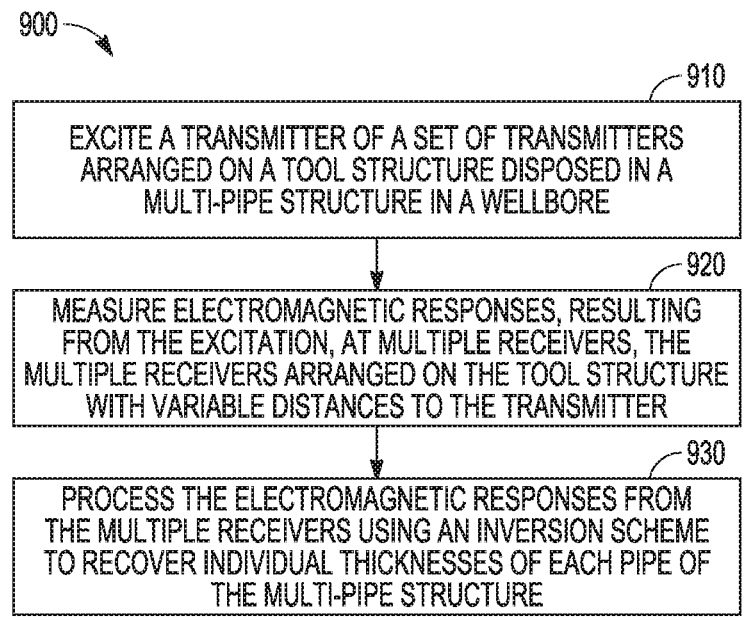
FIG. 9 is a flow diagram of features of a method to determine thicknesses of individual pipes of a multi-pipe structure, in accordance with various embodiments.

FIG. 9 is a flow diagram of features of an embodiment of an example method 900 to determine thicknesses of individual pipes of a multi-pipe structure. Various tool designs taught herein can be used in the method of method 900 or variations thereof. At 910, a transmitter of a set of transmitters arranged on a tool structure disposed in a multi-pipe structure in a wellbore is excited. Exciting the transmitter can include operating the set of transmitters at a plurality of frequencies. The set of transmitters may include one transmitter or a plurality of transmitters. At 920, electromagnetic responses, resulting from the excitation, are measured at multiple receivers, where the multiple receivers are arranged on the tool structure with variable distances to the transmitter. The electromagnetic responses can include responses correlated to a near field zone, a transition zone, and a far field zone. With exciting the transmitter to include operating the set of transmitters at a plurality of frequencies, measuring the electromagnetic responses can include acquiring electromagnetic responses from the multiple receivers at the plurality of frequencies.

At 930, the electromagnetic responses from the multiple receivers are processed using an inversion scheme to recover individual thicknesses of each pipe of the multi-pipe structure. The processing can use the correlation to the near field zone, the transition zone, and the far field zone. With exciting the transmitter to include operating the set of transmitters at a plurality of frequencies and with measuring the electromagnetic responses to include acquiring electromagnetic responses from the multiple receivers at the plurality of frequencies, processing the electromagnetic responses can include conducting the inversion scheme using data from combination of electromagnetic responses from the multiple receivers at the plurality of frequencies. Operating the set of transmitters at the plurality of frequencies can include operating at a frequency between 0.5 and 10 Hz to measure defects of pipes of the multi-pipe structure beyond the innermost pipe and operating at a frequency between to 5 Hz and 1000 Hz to measure defects in the two innermost pipes.

Variations of method 900 or methods similar to method 900 can include a number of different embodiments that may or may not be combined depending on the application of such methods and/or the architecture of systems in which such methods are implemented. The multi-pipe structure can include three or more pipes, each pipe having a thickness determinable using the inversion scheme. The variable distances between the transmitters and the receivers can be between 0.75*L and 5*L, where L is the length of the transmitters. With the multi-pipe structure having an innermost pipe and an outermost pipe, the variable distances between the transmitters and the receivers can be in a range from $2*D_1$ to $4*D_2$, where $D_1$ is the diameter of the innermost pipe and $D_2$ the diameter of the outermost pipe of the multi-pipe structure.

Variations of method 900 or methods similar to method 900 may include processing the electromagnetic responses to include using deconvolution on raw data from some of the receivers of the multiple receivers at every frequency of the plurality of frequencies to remove the effect of distance between the transmitter and the corresponding receiver and also the effect of size of the transmitter or receiver. Exciting the transmitter can include exciting the transmitter by pulse excitation and measuring the electromagnetic responses can include measuring, at the multiple receivers, decay field signals after the transmitter has been turned off.

Variations of method 900 or methods similar to method 900 may include applying a deconvolution, after decay field signals are measured, to reduce the effect of distance between the transmitter and the corresponding receiver and also the effect of size of the transmitter and receiver, followed by an inversion to find location and dimensions of defects in each of the pipes of the multiple-pipe structure. Using an inversion scheme according to method 900 or methods similar to method 900 can include using a response pattern of the multiple receivers.

Variations of method 900 or methods similar to method 900 can include the set of transmitters being a set of one transmitter, the one transmitter arranged on the tool structure separated longitudinally from each receiver of the multiple receivers by a different transmitter-receiver distance than the other receivers of the multiple receivers. Other variations can include exciting the transmitters of the set of transmitters, the set of transmitters being a set of two transmitters, the two transmitters arranged symmetrically with respect to the middle of the tool structure. The multiple receivers can be arranged in pairs at variable distances from the two transmitters.

Variations of method 900 or methods similar to method 900 can include exciting the transmitters of the set of transmitters, the set of transmitters being a plurality of transmitters, one transmitter of the plurality of transmitters having a shorter length than the other transmitters of the plurality of transmitters. Other variations can include measuring electromagnetic responses at multiple receivers to include measuring electromagnetic responses at a plurality of azimuthally sensitive receivers at each of a plurality of different axial distances along the tool structure arranged such that each of the plurality of azimuthally sensitive receivers at each axial distance extends to near an inner surface of the innermost pipe of the multi-pipe structure.

In various embodiments, a non-transitory machine-readable storage device can comprise instructions stored thereon, which, when performed by a machine, cause the machine to perform operations, the operations comprising one or more features similar to or identical to features of methods and techniques described with respect to method 900, variations thereof, and/or features of other methods taught herein such as associated with FIGS. 1-8. The physical structures of such instructions may be operated on by one or more processors. Executing these physical structures can cause the machine to perform operations comprising: exciting a transmitter of a set of transmitters arranged on at tool structure disposed in a multi-pipe structure in a wellbore; measuring electromagnetic responses, resulting from the excitation, at multiple receivers, the multiple receivers arranged on the tool structure with variable distances to the transmitter; and processing the electromagnetic responses from the multiple receivers using an inversion scheme to recover individual thicknesses of each pipe of the multi-pipe structure. Execution of various instructions may be realized by the control circuitry of the machine. The instructions can include instructions to operate a tool or tools having sensors disposed in a multi-pipe structure in a wellbore to provide data to process in accordance with the teachings herein. Such machine-readable storage devices can include instructions to correlate the electromagnetic responses to a near field zone, a transition zone, and a far field zone.

The multi-pipe structure can include three or more pipes, each pipe having a thickness determinable using the inversion scheme. The variable distances between the transmitters and the receivers can be between 0.75*L and 5*L, where L is the length of the transmitters. With the multi-pipe structure having an innermost pipe and an outermost pipe, the variable distances between the transmitters and the receivers can be in a range from $2*D_1$ to $4*D_2$, where $D_1$ is the diameter of the innermost pipe and $D_2$ the diameter of the outermost pipe of the multi-pipe structure.

The operations executed from the instructions can include exciting the transmitter including operating the set of transmitters at a plurality of frequencies; measuring the electromagnetic responses including acquiring electromagnetic responses from the multiple receivers at the plurality of frequencies; and processing the electromagnetic responses including conducting the inversion scheme using data from combination of electromagnetic responses from the multiple receivers at the plurality of frequencies. The operations executed from the instructions can include operating the set of transmitters at the plurality of frequencies to include operating at a frequency between 0.5 and 10 Hz to measure defects of pipes of the multi-pipe structure beyond the innermost pipe and operating at a frequency between to 5 Hz and 1000 Hz to measure defects in the two innermost pipes.

Machine-readable storage devices can include instructions to perform operations that can include processing the electromagnetic responses including using deconvolution on raw data from some of the receivers of the multiple receivers at every frequency of the plurality of frequencies to remove the effect of distance between the transmitter and the corresponding receiver and also the effect of size of the transmitter or receiver. Exciting the transmitter can include exciting the transmitter by pulse excitation and measuring the electromagnetic responses includes measuring, at the multiple receivers, decay field signals after the transmitter has been turned off. Operations can include applying a deconvolution, after decay field signals are measured, to reduce the effect of distance between the transmitter and the corresponding receiver and also the effect of size of the transmitter and receiver, followed by an inversion to find location and dimensions of defects in each of the pipes of the multiple-pipe structure.

Machine-readable storage devices can include instructions to perform operations that can include using an inversion scheme including using a response pattern of the multiple receivers. Operations can include operating a tool with the set of transmitters being a set of one transmitter, the one transmitter arranged on the tool structure separated longitudinally from each receiver of the multiple receivers by a different transmitter-receiver distance than the other receivers of the multiple receivers. Operations may include exciting transmitters of the set of transmitters, the set of transmitters being a set of two transmitters, the two transmitters arranged symmetrically with respect to the middle of the tool structure. Operations may include operating with the multiple receivers arranged in pairs at variable distances from the two transmitters.

Machine-readable storage devices can include instructions to perform operations that can include exciting the transmitters of the set of transmitters, with the set of transmitters being a plurality of transmitters, one transmitter of the plurality of transmitters having a shorter length than the other transmitters of the plurality of transmitters. The operations can include measuring electromagnetic responses at multiple receivers to include measuring electromagnetic responses at a plurality of azimuthally sensitive receivers at each of a plurality of different axial distances along the tool structure arranged such that each of the plurality of azimuthally sensitive receivers at each axial distance extends to near an inner surface of the innermost pipe of the multi-pipe structure.

Further, a machine-readable storage device, herein, is a physical device that stores data represented by physical structure within the device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices. The machine-readable device may be a machine-readable medium such as memory 1035 of FIG. 10. While memory 1035 is shown as a single unit, terms such as "memory," "memory module," "machine-readable medium," "machine-readable device," and similar terms should be taken to include all forms of storage media, either in the form of a single medium (or device) or multiple media (or devices), in all forms. For example, such structures can be realized as centralized database(s), distributed database(s), associated caches, and servers; one or more storage devices, such as storage drives (including but not limited to electronic, magnetic, and optical drives and storage mechanisms), and one or more instances of memory devices or modules (whether main memory; cache storage, either internal or external to a processor; or buffers). Terms such as "memory," "memory module," "machine-readable medium," and "machine-readable device," shall be taken to include any tangible non-transitory medium which is capable of storing or encoding a sequence of instructions for execution by the machine and that cause the machine to perform any one of the methodologies taught herein. The term "non-transitory" used in reference to a "machine-readable device," "medium," "storage medium," "device," or "storage device" expressly includes all forms of storage drives (optical, magnetic, electrical, etc.) and all forms of memory devices (e.g., DRAM, Flash (of all storage designs), SRAM, MRAM, phase change, etc., as well as all other structures designed to store data of any type for later retrieval.

Figure 10:
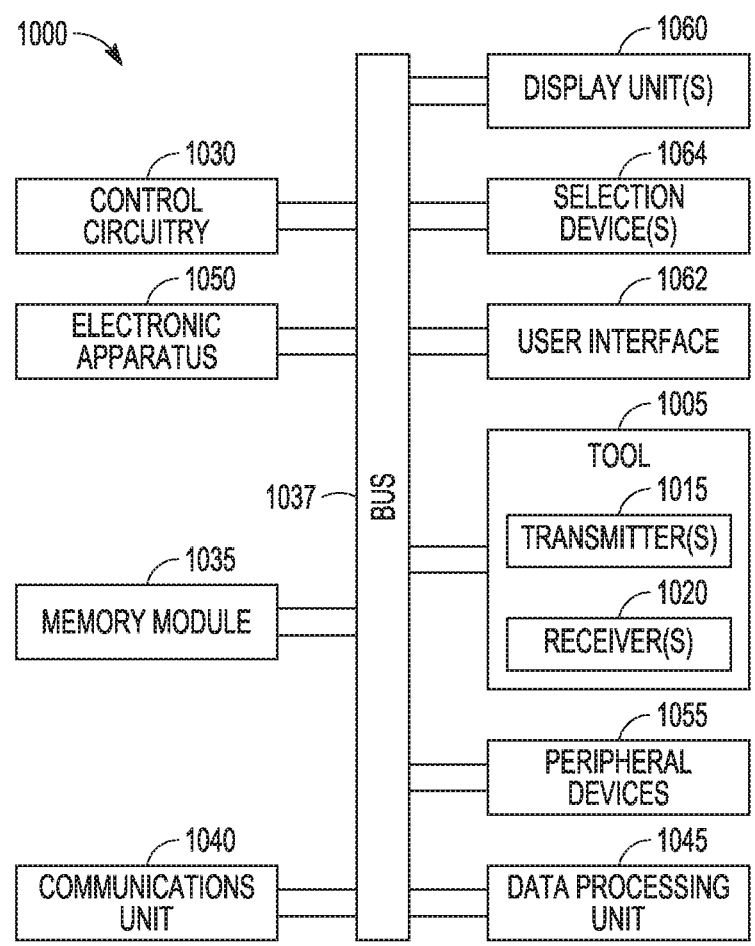
FIG. 10 is a block diagram of features of an example system operable to execute schemes associated with investigation of a multi-pipe structure, in accordance with various embodiments.

FIG. 10 is a block diagram of features of an embodiment of an example system 1000 operable to execute schemes associated with investigation of a multi-pipe structure. The system 1000 can be implemented at a well site to, among other things, determine thickness of each pipe of a multi-pipe structure. Such thickness determination can be used to investigate defects in the multi-pipe structure. The multi-pipe structure may be a production structure of the well site.

The system 1000 can comprise a tool 1005 having a set of transmitters 1015 and multiple receivers 1020 arranged on a tool structure with variable distances from the multiple receivers 1020 to the transmitters of the set of transmitters 1015. The set of transmitters 1015 may include one or more transmitters. The multiple receivers 1020 may be realized as spaced apart receiver arrays. The receivers 1020 can be arranged to measure electromagnetic responses from a multi-pipe structure in response to excitation of the set of transmitters 1015 with the tool structure disposed in the multi-pipe structure, where the electromagnetic responses can include responses correlated to a near field zone, a transition zone, and a far field zone. The multiple receivers 1020 and/or the set of transmitters 1015 can be arranged in a manner similar to or identical to arrangements as taught herein.

The set of transmitters 1015 and the multiple receivers 1020 can be realized in a number of different arrangements. The set of transmitters 1015 can be a set of one transmitter, where the one transmitter is arranged on the tool structure separated longitudinally from each receiver of the multiple receivers by a different transmitter-receiver distance than the other receivers of the multiple receivers. The set of transmitters 1015 can be a set of two transmitters, the two transmitters arranged symmetrically with respect to the middle of the tool structure. With the two transmitters arranged symmetrically with respect to the middle of the tool structure, the multiple receivers 1020 can be arranged in pairs at variable distances from the two transmitters. The set of transmitters 1015 can be a plurality of transmitters, with one transmitter of the plurality of transmitters having a shorter length than the other transmitters of the plurality of transmitters. The multiple receivers 1020 can include a plurality of azimuthally sensitive receivers at each of a plurality of different axial distances along the tool structure arranged such that each of the plurality of azimuthally sensitive receivers at each axial distance extends to near an inner surface of the innermost pipe of the multi-pipe structure.

The tool 1005 may be operably disposed in the multi-pipe structure being investigated in a wellbore. The tool 1005 can be moved along a longitudinal axis of the tool 1005 and/or a longitudinal axis of each pipe of a multi-pipe structure being investigated using conventional mechanisms of the oil and gas industry, such as but not limited to, slickline arrangements, wireline arrangements, coiled tubing arrangements, drill pipe arrangements, downhole tractor arrangements, or other appropriate arrangements. Features of the tool 1005 and variations thereof may be similar to or identical tools as discussed herein.

The multi-pipe structure can include three or more pipes, each pipe having a thickness determinable using the inversion scheme. The variable distances between the transmitters and the receivers can be between 0.75*L and 5*L, where L is the length of the transmitters. With the multi-pipe structure having an innermost pipe and an outermost pipe, the variable distances between the transmitters and the receivers can be in a range from $2*D_1$ to $4*D_2$, where $D_1$ is the diameter of the innermost pipe and $D_2$ the diameter of the outermost pipe of the multi-pipe structure.

The system 1000 can also comprise a controller 1030. The controller 1030 can be arranged to control variable current levels to the set of transmitters to excite the selected ones of the pipes being investigated. The controller 1030 can be realized as one or more processors. The controller 1030 can be arranged as a single processor or a group of processors. Processors of the group of processors may operate independently depending on an assigned function. The controller 1030 can be realized as one or more application-specific integrated circuits (ASICs). The controller 1030 can be realized as control circuitry to manage the components of system 1000. The controller 1030 and/or some of the other components of system 1000 may be disposed within tool 1005.

The controller 1030 can be arranged to operate the set of transmitters 1015, to acquire electromagnetic responses from the multiple receivers 1020 correlated to the near field zone, the transition zone, and the far field zone, and to process the electromagnetic responses from the multiple receivers 1020 using an inversion scheme to recover individual thicknesses of each pipe of the multi-pipe structure. In various embodiments, the inversion scheme can use a response pattern of the multiple receivers.

The controller 1030 can be arranged to operate the set of transmitters 1015 at a plurality of frequencies, to acquire electromagnetic responses from the multiple receivers 1020 at the plurality of frequencies, and to conduct the inversion scheme using data from combination of electromagnetic responses from the multiple receivers 1020 at the plurality of frequencies. The plurality of frequencies can include a frequency between 0.5 and 10 Hz to measure defects of pipes of the multi-pipe structure beyond the innermost pipe and a frequency between 10 Hz and 1000 Hz to measure defects in the two innermost pipes. The controller 1030 can be operable to use deconvolution on raw data from some of the receivers of the multiple receivers 1020 at every frequency of the plurality of frequencies to remove the effect of distance between the transmitter and the corresponding receiver and also the effect of size of the transmitter or receiver.

The controller 1030 can be arranged to excite the transmitters in the set of transmitters 1015 by pulse excitation with the multiple receivers 1020, placed at different distances with respect to the set of transmitters 1015, to measure decay field signals after the transmitter has been turned off. With the measurement of decay field signals, the controller 1030 can be arranged to apply a deconvolution, after decay field signals are measured, to reduce the effect of distance between the transmitter and the corresponding receiver and also the effect of size of the transmitter and receiver, followed by an inversion to find location and dimensions of defects in each of the pipes of the multiple-pipe structure.

The controller 1030 can be arranged to direct remedial operations with respect to the multiple-pipe structure in response to determination of the thickness of individual pipes of the multiple-pipe structure. In controlling operation of the components of system 1000 to execute schemes associated with investigation of the multiple-pipe structure, the controller 1030 can direct access of data to and from a database. The database can include parameters and/or expected parameters for the pipes being investigated such as, but not limited to, diameter (d), thickness (th), magnetic permeability ($\mu$) and electrical conductivity ($\sigma$).

The system 1000 can include a user interface 1062 operable with the controller 1030, a data processing unit 1045 operable with the user interface 1062, where the controller 1030, the user interface 1062, and the data processing unit 1045 can be structured to be operated according to any scheme similar to or identical to the schemes associated with determining thickness in the multiple-pipe structure as taught herein. The thickness determination can be used to determine defects in pipes of the multiple-pipe structure. The system 1000 can be arranged to perform various operations on the data, acquired from the tool 1005 operational in a multiple-pipe structure, in a manner similar or identical to any of the processing techniques discussed herein.

The system 1000 can be arranged as a distributed system. Data from operating the tool 1005 at various depths in the multiple-pipe structure can be processed by the one or more processors 1030. Alternatively, thickness analysis and subsequent defect analysis may be conducted by the data processing unit 1045 as a dedicated analysis module. In various embodiments, the one or more processors 1030 and/or the data processing unit 1045 may be arranged in a housing conveyable with tool 1005 downhole. Such housing may be part of tool 1005.

The system 1000 can include a memory 1035, an electronic apparatus 1050, and a communications unit 1040. The controller 1030, the memory 1035, and the communications unit 1040 can be arranged to operate as a processing unit to control management of tool 1005 and to perform operations on data signals collected by the tool 1005. The memory 1035 can be realized as a memory module, which may include a set of memory devices and access devices to interface with the set of memory devices. The memory 1035 can include a database having information and other data such that the system 1000 can operate on data from the tool 1005, in an embodiment, the data processing unit 1045 can be distributed among the components of the system 1000 including memory 1035 and/or the electronic apparatus 1050. The electronic apparatus 1050 can include drivers to provide voltage and/or current input to the set of transmitters 1015 and circuitry to handle signals acquired by the receivers 1020.

The communications unit 1040 can include downhole communications for communication to the surface at a well site from the tool 1005 in a multi-pipe structure. The communications unit 1040 may use combinations of wired communication technologies and wireless technologies at frequencies that do not interfere with on-going measurements. The communications unit 1040 can allow for a portion or all of the data analysis to be conducted within a multiple-pipe structure with results provided to the user interface 1062 for presentation on the one or more display unit(s) 1060 aboveground. The communications unit 1040 can provide for data to be sent aboveground such that substantially all analysis is performed aboveground. The data collected by the tool 1005 can be stored with the tool 1005 that can be brought to the surface to provide the data to the one or more processors 1030, the user interface 1062, and the data processing unit 1045. The communications unit 1040 can allow for transmission of commands to tool 1005 in response to signals provided by a user through the user interface 1062. Such commands may be generated from autonomous operation of the system 1000, once initiated.

The system 1000 can also include a bus 1037, where the bus 1037 provides electrical conductivity among the components of the system 1000. The bus 1037 can include an address bus, a data bus, and a control bus, each independently configured. The bus 1037 can be realized using a number of different communication mediums that allows for the distribution of components of the system 1000. Use of the bus 1037 can be regulated by the controller 1030. The bus 1037 can include a communications network to transmit and receive signals including data signals and command and control signals. In a distributed architecture, the bus 1037 may be part of a communications network.

In various embodiments, peripheral devices 1055 can include additional storage memory and/or other control devices that may operate in conjunction with the processor(s) 1030 and/or the memory 1035. The display unit(s) 1060 can be arranged with a screen display, as a distributed component on the surface with respect to a well site, that can be used with instructions stored in the memory 1035 to implement the user interface 1062 to manage the operation of the tool 1005 and/or components distributed within the system 1000. Such a user interface can be operated in conjunction with the communications unit 1040 and the bus 1037. The display unit(s) 1060 can include a video screen, a printing device, or other structure to visually project data/information and images. The system 1000 can include a number of selection devices 1064 operable with the user interface 1062 to provide user inputs to operate the data processing unit 1045 or its equivalent. The selection device(s) 1064 can include one or more of a touch screen, a computer mouse, or other control device operable with the user interface 1062 to provide user inputs to operate the data processing unit 1045 or other components of the system 1000.

The following are example embodiments of systems methods, and machine readable storage devices, in accordance with the teachings herein.

A system 1 can comprise: a set of transmitters; multiple receivers arranged on a tool structure with variable distances to the transmitters of the set of transmitters, the receivers arranged to measure electromagnetic responses from a multi-pipe structure in response to excitation of the set of transmitters with the tool structure disposed in the multi-pipe structure; and a controller arranged to operate the set of transmitters, and to process the electromagnetic responses from the multiple receivers using an inversion scheme to recover individual thicknesses of each pipe of the multi-pipe structure.

A system 2 can include elements of system 1 and can include the multi-pipe structure to include three or more pipes, each pipe having a thickness determinable using the inversion scheme.

A system 3 can include elements of any of systems 1 and 2, and can include the variable distances between the transmitters and the receivers being between 0.75*L and 5*L, where L is the length of the transmitters.

A system 4 can include elements of any of systems 1-3 and can include the multi-pipe structure having an innermost pipe and an outermost pipe and the variable distances between the transmitters and the receivers being in a range from $2*D_1$ to $4*D_2$, where $D_1$ is the diameter of the innermost pipe and $D_2$ the diameter of the outermost pipe of the multi-pipe structure.

A system 5 can include elements of any of systems 1-4 and can include the controller arranged to operate the set of transmitters at a plurality of frequencies, to acquire electromagnetic responses from the multiple receivers at the plurality of frequencies, and to conduct the inversion scheme using data from combination of electromagnetic responses from the multiple receivers at the plurality of frequencies.

A system 6 can include elements of system 5 and elements of any of systems 1-4 and can include the plurality of frequencies to include a frequency between 0.1 and 20 Hz to measure defects of pipes of the multi-pipe structure beyond the innermost pipe and a frequency between 5 Hz and 1000 Hz to measure defects in the innermost pipe. A system 7 can include elements of system 5 and elements of any of systems 1-4 and 6, and can include the controller being operable to use deconvolution on raw data from some of the receivers of the multiple receivers at every frequency of the plurality of frequencies to remove the effect of distance between the transmitter and the corresponding receiver and also the effect of size of the transmitter or receiver.

A system 8 can include elements of any of systems 1-7 and can include the controller arranged to excite the transmitters in the set of transmitters by pulse excitation with the multiple receivers, placed at different distances with respect to the set of transmitters, to measure decay field signals after the transmitter has been turned off.

A system 9 can include elements of system 8 and elements of any of systems 1-7 and can include the controller arranged to apply a deconvolution, after decay field signals are measured, to reduce the effect of distance between the transmitter and the corresponding receiver and also the effect of size of the transmitter and receiver, followed by an inversion to find location and dimensions of defects in each of the pipes of the multiple-pipe structure.

A system 10 can include elements of any of systems 1-9 and can include the inversion scheme structured to use a response pattern of the multiple receivers.

A system 11 can include elements of any of systems 1-10 and can include the set of transmitters arranged as a set of one transmitter, the one transmitter arranged on the tool structure separated longitudinally from each receiver of the multiple receivers by a different transmitter-receiver distance than the other receivers of the multiple receivers.

A system 12 can include elements of any of systems 1-11 and can include the set of transmitters being a set of two transmitters, the two transmitters arranged symmetrically with respect to the middle of the tool structure.

A system 13 can include elements of system 12 and elements of any of systems 1-11 and can include the multiple receivers arranged in pairs at variable distances from the two transmitters.

A system 14 can include elements of any of systems 1-13 and can include the set of transmitters being a plurality of transmitters, one transmitter of the plurality of transmitters having a shorter length than the other transmitters of the plurality of transmitters.

A system 15 can include elements of any of systems 1-14 and can include the multiple receivers to include a plurality of azimuthally sensitive receivers at each of a plurality of different axial distances along the tool structure arranged such that each of the plurality of azimuthally sensitive receivers at each axial distance extends to near an inner surface of the innermost pipe of the multi-pipe structure.

A method 1 can comprise: exciting a transmitter of a set of transmitters arranged on at tool structure disposed in a multi-pipe structure in a wellbore; measuring electromagnetic responses, resulting from the excitation, at multiple receivers, the multiple receivers arranged on the tool structure with variable distances to the transmitter; and processing the electromagnetic responses from the multiple receivers using an inversion scheme to recover individual thicknesses of each pipe of the multi-pipe structure.

A method 2 can include elements of method 1 and can include the multi-pipe structure to include three or more pipes, each pipe having a thickness determinable using the inversion scheme.

A method 3 can include elements of method 1 and 2 and can include the variable distances between the transmitters and the receivers being between 0.75*L and 5*L, where L is the length of the transmitters.

A method 4 can include elements of any of methods 1-3 and can include the multi-pipe structure having an innermost pipe and an outermost pipe and the variable distances between the transmitters and the receivers being in a range from $2*D_1$ to $4*D_2$, where $D_1$ is the diameter of the innermost pipe and $D_2$ the diameter of the outermost pipe of the multi-pipe structure.

A method 5 can include elements of any of methods 1-4 and can include exciting the transmitter to include operating the set of transmitters at a plurality of frequencies; measuring the electromagnetic responses includes acquiring electromagnetic responses from the multiple receivers at the plurality of frequencies; and processing the electromagnetic responses includes conducting the inversion scheme using data from combination of electromagnetic responses from the multiple receivers at the plurality of frequencies.

A method 6 can include elements of method 5 and elements of any of methods 1-4 and can include operating the set of transmitters at the plurality of frequencies to include operating at a frequency between 0.1 and 20 Hz to measure defects of pipes of the multi-pipe structure beyond the innermost pipe and operating at a frequency between to 5 Hz and 1000 Hz to measure defects in the innermost pipe.

A method 7 can include elements of method 5 and elements of any of methods 1-4 and 6 and can include processing the electromagnetic responses to include using deconvolution on raw data from some of the receivers of the multiple receivers at every frequency of the plurality of frequencies to remove the effect of distance between the transmitter and the corresponding receiver and also the effect of size of the transmitter or receiver.

A method 8 can include elements of any of methods 1-7 and can include exciting the transmitter to include exciting the transmitter by pulse excitation and measuring the electromagnetic responses includes measuring, at the multiple receivers, decay field signals after the transmitter has been turned off.

A method 9 can include elements of method 8 and elements of any of methods 1-7 and can include applying a deconvolution, after decay field signals are measured, to reduce the effect of distance between the transmitter and the corresponding receiver and also the effect of size of the transmitter and receiver, followed by an inversion to find location and dimensions of defects in each of the pipes of the multiple-pipe structure.

A method 10 can include elements of any of methods 1-9 and can include using an inversion scheme includes using a response pattern of the multiple receivers.

A method 11 can include elements of any of methods 1-10 and can include the set of transmitters being a set of one transmitter, the one transmitter arranged on the tool structure separated longitudinally from each receiver of the multiple receivers by a different transmitter-receiver distance than the other receivers of the multiple receivers.

A method 12 can include elements of any of methods 1-11 and can include exciting the transmitters of the set of transmitters, the set of transmitters being a set of two transmitters, the two transmitters arranged symmetrically with respect to the middle of the tool structure.

A method 13 can include elements of method 12 and elements of any of methods 1-11 and can include the multiple receivers arranged in pairs at variable distances from the two transmitters.

A method 14 can include elements of any of methods 1-13 and can include exciting the transmitters of the set of transmitters, the set of transmitters being a plurality of transmitters, one transmitter of the plurality of transmitters having a shorter length than the other transmitters of the plurality of transmitters.

A method 15 can include elements of any of methods 1-14 and can include measuring electromagnetic responses at multiple receivers to include measuring electromagnetic responses at a plurality of azimuthally sensitive receivers at each of a plurality of different axial distances along the tool structure arranged such that each of the plurality of azimuthally sensitive receivers at each axial distance extends to near an inner surface of the innermost pipe of the multi-pipe structure.

A machine-readable storage device 1 having instructions stored thereon, which, when executed by a processor of a machine, cause the machine to perform operations, the operations comprising: exciting a transmitter of a set of transmitters arranged on at tool structure disposed in a multi-pipe structure in a wellbore; measuring electromagnetic responses, resulting from the excitation, at multiple receivers, the multiple receivers arranged on the tool structure with variable distances to the transmitter; and processing the electromagnetic responses from the multiple receivers using an inversion scheme to recover individual thicknesses of each pipe of the multi-pipe structure.

A machine-readable storage device 2 can include elements of machine-readable storage device 1 and operations can include the multi-pipe structure to include three or more pipes, each pipe having a thickness determinable using the inversion scheme.

A machine-readable storage device 3 can include elements of machine-readable storage device 1 and 2 and operations can include the variable distances between the transmitters and the receivers being between 0.75*L and 5*L, where L is the length of the transmitters.

A machine-readable storage device 4 can include elements of machine-readable storage devices 1-3 and can include the multi-pipe structure having an innermost pipe and an outermost pipe and the variable distances between the transmitters and the receivers being in a range from $2*D_1$ to $4*D_2$, where $D_1$ is the diameter of the innermost pipe and $D_2$ the diameter of the outermost pipe of the multi-pipe structure.

A machine-readable storage device 5 can include elements of machine-readable storage device 1 and elements of any of machine-readable storage devices 1-4 and operations can include exciting the transmitter to include operating the set of transmitters at a plurality of frequencies; measuring the electromagnetic responses includes acquiring electromagnetic responses from the multiple receivers at the plurality of frequencies; and processing the electromagnetic responses includes conducting the inversion scheme using data from combination of electromagnetic responses from the multiple receivers at the plurality of frequencies.

A machine-readable storage device 6 can include elements of machine-readable storage device 5 and elements of machine-readable storage devices 1-4 and operations can include operating the set of transmitters at the plurality of frequencies to include operating at a frequency between 0.1 and 20 Hz to measure defects of pipes of the multi-pipe structure beyond the innermost pipe and operating at a frequency between to 5 Hz and 1000 Hz to measure defects in the innermost pipe.

A machine-readable storage device 7 can include elements of machine-readable storage device 5 and elements of any of machine-readable storage devices 1-4 and 6 and operations can include processing the electromagnetic responses to include using deconvolution on raw data from some of the receivers of the multiple receivers at every frequency of the plurality of frequencies to remove the effect of distance between the transmitter and the corresponding receiver and also the effect of size of the transmitter or receiver.

A machine-readable storage device 8 can include elements of any of machine-readable storage devices 1-7 and operations can include exciting the transmitter to include exciting the transmitter by pulse excitation and measuring the electromagnetic responses includes measuring, at the multiple receivers, decay field signals after the transmitter has been turned off.

A machine-readable storage device 9 can include elements of machine-readable storage device 8 and elements of any of machine-readable storage devices 1-7 and operations can include applying a deconvolution, after decay field signals are measured, to reduce the effect of distance between the transmitter and the corresponding receiver and also the effect of size of the transmitter and receiver, followed by an inversion to find location and dimensions of defects in each of the pipes of the multiple-pipe structure.

A machine-readable storage device 10 can include elements of any of machine-readable storage devices 1-9 and operations can include using an inversion scheme includes using a response pattern of the multiple receivers.

A machine-readable storage device 11 can include elements of any of machine-readable storage devices 1-10 and operations can include the set of transmitters being a set of one transmitter, the one transmitter arranged on the tool structure separated longitudinally from each receiver of the multiple receivers by a different transmitter-receiver distance than the other receivers of the multiple receivers.

A machine-readable storage device 12 can include elements of any of machine-readable storage devices 1-11 and operations can include exciting the transmitters of the set of transmitters, the set of transmitters being a set of two transmitters, the two transmitters arranged symmetrically with respect to the middle of the tool structure.

A machine-readable storage device 13 can include elements of machine-readable storage device 12 and elements of any of machine-readable storage devices 1-11 and operations can include the multiple receivers arranged in pairs at variable distances from the two transmitters.

A machine-readable storage device 14 can include elements of any of machine-readable storage devices 1-13 and operations can include exciting the transmitters of the set of transmitters, the set of transmitters being a plurality of transmitters, one transmitter of the plurality of transmitters having a shorter length than the other transmitters of the plurality of transmitters.

A machine-readable storage device 15 can include elements of any of machine-readable storage devices 1-14 and operations can include measuring electromagnetic responses at multiple receivers to include measuring electromagnetic responses at a plurality of azimuthally sensitive receivers at each of a plurality of different axial distances along the tool structure arranged such that each of the plurality of azimuthally sensitive receivers at each axial distance extends to near an inner surface of the innermost pipe of the multi-pipe structure.

Induction logging for determination of conductivity of formations may also use multiple transmitter-receiver distances, but the context and the theory that is applied in those cases is very different. Formation conductivity in the cases corresponding to conductivity determination ranges between 0.0001 and 20 S/m, while in the pipe corrosion measurement scenario, pipe conductivity is of the order of 10,000,000 S/m. The frequencies used in induction logging for determination of conductivity are in the kHz range, which is completely different from the frequencies used in corrosion detection that range between 0.1 and 20 Hz for multiple pipes and 20 to 1000 Hz for the first pipe of a multi-pipe structure. In induction logging, bucking is an important technique to cancel the direct field, but, in corrosion detection applications, bucking coils are not necessary. In addition, the physics of induction logging and that of corrosion detection are completely different.

Unlike other frequency domain tools in the market that operate in the remote field eddy current regime, the corrosion detection tools, as taught herein, can be used to estimate accurately the thickness of individual pipes. Such techniques are especially suited to estimate the thickness of pipes in configurations with multiple pipes of four, five, or more pipes as well as the standard cases of one, two, and three pipes. There is currently no tool available in the market to estimate the thickness in configurations with large number (four, five, or more) of concentric pipes.

The detection tools, as taught herein, can deliver unprecedented accuracy of thickness estimation. Such tools measure electromagnetic field at multiple transmitter-receiver distances and at multiple frequencies. Data of each receiver array of the tool can be processed with deconvolution to reduce shoulder bed effect. Inversion can be used to recover the thicknesses of individual pipes.

The detection tools, as taught herein, include multiple transmitter-receiver distances to measure the field going from the near field to the far field. Such tools can be implemented for pipe diameters varying from two inches to 20 inches, for example, in a single pipe or multiple pipes such as concentric pipes. The measurement at multiple distances are then used in an inversion to find the metal loss due to corrosion in each of the pipes of a multiple pipe configuration with one, two, and three concentric pipes as in conventional cases or four, five, or even six pipes for a total thickness of more than two inches of metal.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A system comprising:
    a set of transmitters;
    multiple receivers arranged on a tool structure with variable distances to one or more transmitters of the set of transmitters, the multiple receivers arranged to measure electromagnetic responses from a multi-pipe structure in response to excitation of the set of transmitters with the tool structure disposed in the multi-pipe structure, wherein the multi-pipe structure has an innermost pipe; and
    a controller arranged to operate the set of transmitters, to acquire electromagnetic responses from the multiple receivers, and to process the electromagnetic responses from the multiple receivers using an inversion scheme to recover individual thicknesses of each pipe of the multi-pipe structure,
    wherein the controller is arranged to operate the set of transmitters at a plurality of frequencies, to acquire electromagnetic responses from the multiple receivers at the plurality of frequencies, and to conduct the inversion scheme using data from a combination of electromagnetic responses from the multiple receivers at the plurality of frequencies,
    wherein the plurality of frequencies includes a first frequency between 0.1 and 20 Hz to measure defects of pipes of the multi-pipe structure beyond the innermost pipe and a second frequency between 5 Hz and 1000 Hz to measure defects in the innermost pipe.

2. The system of claim 1, wherein the multi-pipe structure includes three or more pipes, each pipe having a thickness determinable using the inversion scheme.

3. The system of claim 1, wherein the variable distances between the one or more transmitters and the multiple receivers are between 0.75*L and 5*L, where L is the length of the one or more transmitters.

4. The system of claim 1, wherein the multi-pipe structure has an outermost pipe and the variable distances between the one or more transmitters and the multiple receivers are in a range from $2*D_1$ to $4*D_2$, where $D_1$ is the diameter of the innermost pipe and $D_2$ the diameter of the outermost pipe of the multi-pipe structure.

5. The system of claim 1,
    wherein the controller is operable to use deconvolution on raw data from some of the receivers of the multiple receivers at every frequency of the plurality of frequencies to remove an effect of distance between a transmitter and a corresponding receiver and also an effect of size of the transmitter or the corresponding receiver.

6. The system of claim 1, wherein the inversion scheme uses a response pattern of the multiple receivers.

7. The system of claim 1, wherein the set of transmitters is a set of one transmitter, the one transmitter arranged on the tool structure separated longitudinally from each receiver of the multiple receivers by a different transmitter-receiver distance than the other receivers of the multiple receivers.

8. The system of claim 1,
    wherein the set of transmitters is a set of two transmitters, the two transmitters axially separated and arranged symmetrically with respect to the middle of the tool structure, and
    wherein a plurality of the multiple receivers are disposed between the two transmitters and arranged in pairs at variable distances from the two transmitters.

9. The system of claim 1, wherein the set of transmitters is a plurality of transmitters, one transmitter of the plurality of transmitters having a shorter length than the other transmitters of the plurality of transmitters.

10. The system of claim 1, wherein the multiple receivers include a plurality of azimuthally sensitive receivers at each of a plurality of different axial distances along the tool structure arranged such that each of the plurality of azimuthally sensitive receivers at each axial distance extends to near an inner surface of the innermost pipe of the multi-pipe structure.

11. A system comprising:
    a set of transmitters;
    multiple receivers arranged on a tool structure with variable distances to one or more transmitters of the set of transmitters, the multiple receivers arranged to measure electromagnetic responses from a multi-pipe structure in response to excitation of the set of transmitters with the tool structure disposed in the multi-pipe structure; and
    a controller arranged to operate the set of transmitters and to acquire electromagnetic responses from the multiple receivers,
    wherein the controller is arranged to excite the one or more transmitters in the set of transmitters by pulse excitation with the multiple receivers, placed at different distances with respect to the set of transmitters, to measure decay field signals after the one or more transmitters have been turned off, and
    wherein the controller is arranged to apply a deconvolution, after decay field signals are measured, to reduce an effect of distance between a transmitter and a corresponding receiver and also an effect of size of the transmitter and the corresponding receiver, followed by an inversion to find location and dimensions of defects in each of pipe of the multi-pipe structure.

12. A method comprising:
exciting a transmitter of a set of transmitters arranged on a tool structure disposed in a multi-pipe structure in a wellbore, wherein the multi-pipe structure has an innermost pipe;
measuring electromagnetic responses, resulting from the excitation, at multiple receivers, the multiple receivers arranged on the tool structure with variable distances to the transmitter; and
processing the electromagnetic responses from the multiple receivers using an inversion scheme to recover individual thicknesses of each pipe of the multi-pipe structure,
wherein exciting the transmitter includes operating the set of transmitters at a plurality of frequencies, measuring the electromagnetic responses includes acquiring electromagnetic responses from the multiple receivers at the plurality of frequencies, and processing the electromagnetic responses includes conducting the inversion scheme using data from a combination of electromagnetic responses from the multiple receivers at the plurality of frequencies,
wherein operating the set of transmitters at the plurality of frequencies include operating at a first frequency between 0.1 and 20 Hz to measure defects of pipes of the multi-pipe structure beyond the innermost pipe and operating at a second frequency between to 5 Hz and 1000 Hz to measure defects in the innermost pipe.

13. The method of claim 12, wherein the multi-pipe structure includes three or more pipes, each pipe having a thickness determinable using the inversion scheme.

14. The method of claim 12,
wherein the variable distances between the transmitter and the multiple receivers are between 0.75*L and 5*L, where L is the length of the transmitter, and
wherein the multi-pipe structure has an outermost pipe and the variable distances between the transmitter and the multiple receivers are in a range from $2*D_1$ to $4*D_2$, where $D_1$ is the diameter of the innermost pipe and $D_2$ the diameter of the outermost pipe of the multi-pipe structure.

15. The method of claim 12,
wherein processing the electromagnetic responses includes using deconvolution on raw data from some of the receivers of the multiple receivers at every frequency of the plurality of frequencies to remove an effect of distance between the transmitter and a corresponding receiver and also an effect of size of the transmitter or the corresponding receiver.

16. The method of claim 12,
wherein using the inversion scheme includes using a response pattern of the multiple receivers, and
wherein the set of transmitters is a set of one transmitter, the one transmitter arranged on the tool structure separated longitudinally from each receiver of the multiple receivers by a different transmitter-receiver distance than the other receivers of the multiple receivers.

17. The method of claim 12,
wherein method includes exciting two transmitters of the set of transmitters,
wherein the two transmitters are axially separated and arranged symmetrically with respect to the middle of the tool structure, and
wherein a plurality of the multiple receivers are disposed between the two transmitters and arranged in pairs at variable distances from the two transmitters.

18. The method of claim 12,
wherein method includes exciting a plurality of transmitters of the set of transmitters,
wherein one transmitter of the plurality of transmitters has a shorter length than the other transmitters of the plurality of transmitters, and
wherein measuring electromagnetic responses at multiple receivers includes measuring electromagnetic responses at a plurality of azimuthally sensitive receivers at each of a plurality of different axial distances along the tool structure arranged such that each of the plurality of azimuthally sensitive receivers at each axial distance extends to near an inner surface of the innermost pipe of the multi-pipe structure.

19. A method comprising:
exciting a transmitter of a set of transmitters arranged on a tool structure disposed in a multi-pipe structure in a wellbore; and
measuring electromagnetic responses, resulting from the excitation, at multiple receivers, the multiple receivers arranged on the tool structure with variable distances to the transmitter,
wherein exciting the transmitter includes exciting the transmitter by pulse excitation and measuring the electromagnetic responses includes measuring, at the multiple receivers, decay field signals after the transmitter has been turned off, and
wherein the method includes applying a deconvolution, after decay field signals are measured, to reduce an effect of distance between the transmitter and a corresponding receiver and also an effect of size of the transmitter and the corresponding receiver, followed by an inversion to find location and dimensions of defects in each of pipe of the multi-pipe structure.

20. A machine-readable storage device having instructions stored thereon, which, when executed by a processor of a machine, cause the machine to perform operations, the operations comprising:
exciting a transmitter of a set of transmitters arranged on a tool structure disposed in a multi-pipe structure in a wellbore, wherein the multi-pipe structure has an innermost pipe;
measuring electromagnetic responses, resulting from the excitation, at multiple receivers, the multiple receivers arranged on the tool structure with variable distances to the transmitter; and
processing the electromagnetic responses from the multiple receivers using an inversion scheme to recover individual thicknesses of each pipe of the multi-pipe structure,
wherein exciting the transmitter includes operating the set of transmitters at a plurality of frequencies, measuring the electromagnetic responses includes acquiring electromagnetic responses from the multiple receivers at the plurality of frequencies, and processing the electromagnetic responses includes conducting the inversion scheme using data from a combination of electromagnetic responses from the multiple receivers at the plurality of frequencies,
wherein operating the set of transmitters at the plurality of frequencies include operating at a first frequency between 0.1 and 20 Hz to measure defects of pipes of the multi-pipe structure beyond the innermost pipe and operating at a second frequency between to 5 Hz and 1000 Hz to measure defects in the innermost pipe.

* * * * *